United States Patent [19]
Matthäus et al.
[11] 4,362,897
[45] Dec. 7, 1982

[54] HIGH-VOLTAGE BUSHING WITH LAYERS OF PRESHRUNK EMBOSSED INSULATING FOILS

[75] Inventors: Günther Matthäus, Spardorf; Joachim Ruffer, Erlangen; Andreas Diller, Hallstadt, all of Fed. Rep. of Germany

[73] Assignee: Siemens Aktiengesellschaft, Munich, Fed. Rep. of Germany

[21] Appl. No.: 221,256

[22] Filed: Dec. 30, 1980

[30] Foreign Application Priority Data

Jan. 18, 1980 [DE] Fed. Rep. of Germany ....... 3001779

[51] Int. Cl.[3] ....................... H01B 17/28; H01G 4/22; H01G 4/32

[52] U.S. Cl. ................................. 174/31 R; 174/143; 264/342 R; 361/315; 361/323; 361/326

[58] Field of Search ................. 174/25 R, 25 G, 25 P, 174/31 R, 143; 361/303, 304, 314, 315, 323, 326; 264/342 R

[56] References Cited

U.S. PATENT DOCUMENTS

| | | | |
|---|---|---|---|
| 3,430,116 | 2/1969 | Johnstone | 361/323 X |
| 3,462,545 | 8/1969 | Grimmer | 174/143 |
| 3,991,451 | 11/1976 | Maruyama et al. | 361/323 X |

FOREIGN PATENT DOCUMENTS

| | | | |
|---|---|---|---|
| 2327629 | 12/1974 | Fed. Rep. of Germany | 174/15 S |
| 45-2120 | 1/1970 | Japan | 264/342 R |
| 405,450 | 7/1966 | Switzerland | 174/143 |

OTHER PUBLICATIONS

Brand, U., et al., "Gas Impregnated Plastic Foils for High Voltage Insulation", CIGRE Paper No. 15-02, 1972, 8 pp.

Boening, P., *Kleines Lehrbuch der Elektrischen Festigkeit*, Karlsruhe, 1955, pp. 140-142.

Dietz, H., et al., "A Condenser Bushing with $SF_6$-Impregnated Plastic film Insulation", Third International Symposium on High Voltage Engineering, Milan, Italy, Aug. 28-31, 1979, Report No. 32.09.

*Primary Examiner*—Laramie E. Askin
*Attorney, Agent, or Firm*—Kenyon & Kenyon

[57] ABSTRACT

A high voltage insulator bushing is formed of wound insulating foils and is provided with conductive parts which are at different electric potentials and with a wound insulator body arranged between the conductive parts. The wound insulator body contains layers of an embossed insulating foil which consists of a plastic material which shrinks above a predetermined temperature. The embossed insulating foil is subjected to a thermal shrinking treatment prior to being wound as part of the insulator body. Such preshrinking prevents further shrinkage which would occur when the high voltage bushing is operated. Smooth insulating foil may be wound as part of the insulator body so as to be interposed between the layers of the embossed insulating foil. The gaps and voids which are formed between the layers of insulating foils caused by the irregular surface of the embossed insulating foil are filled with an insulating medium.

5 Claims, 2 Drawing Figures

FIG 2

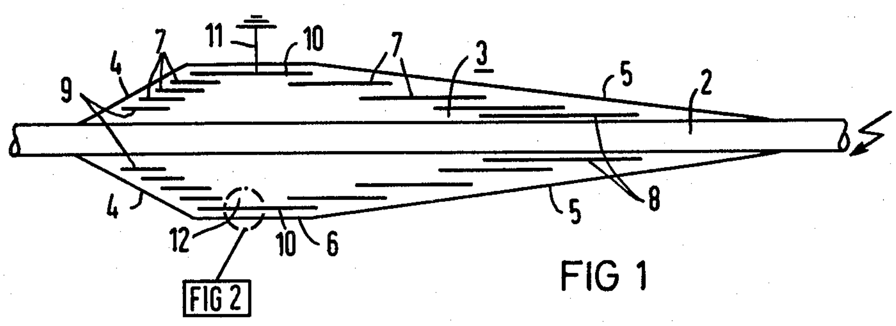
FIG 1
FIG 2
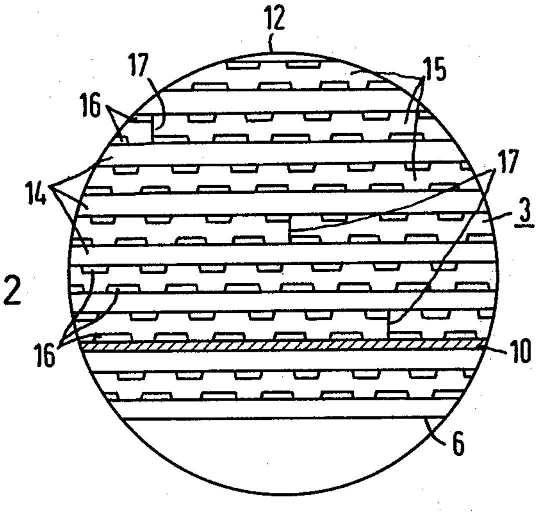

HIGH-VOLTAGE BUSHING WITH LAYERS OF PRESHRUNK EMBOSSED INSULATING FOILS

BACKGROUND OF THE INVENTION

This invention relates generally to bushings for insulating conductors bearing high voltages from ground potential, and more particularly, to an insulator body comprising wound embossed insulating foils of a heat shrinkable material and containing electrically conductive potential control inserts.

DISCUSSION OF THE PRIOR ART

It is often desirable in high voltage systems to pass high voltage conductors bearing potentials of 100 kilovolts, and greater, through or near other conductive parts which are at ground potential. Typical high voltage devices which have a high possibility of producing arcing and flash-over include terminals of high voltage transformers and terminations of high voltage cables in switching gear. There is a need, therefore, for high voltage insulator devices which reliably suppress arcing.

The prior art has thrust at the problem of undesirable voltage breakdowns by providing bushing insulators of the type which surround high voltage conductors. One such insulator bushing is described in the publication "Third International Symposium on High-Voltage Engineering", Italy, Aug. 28–31, 1979, Report No. 32.09. This reference teaches a feedthrough insulator for a cable termination, the insulator being constructed of flexible, electrically insulating material, illustratively polypropylene foils, which are wound around the conductor. The bushing contains inserts of electrically conductive foil material which are wound concentrically with respect to one another and insulated from each other. The conductive inserts function within the bushing to control the distribution of the electric field throughout the bushing insulator, and thereby improve the ability of the bushing to withstand surge voltages. For a discussion of the characteristics of dielectric materials, see: P. Boening; *Kleines Lehrbuch der Elektrischen Festigkeit* (Small Textbook on Dielectric Strength), Karlsruhe, 1955, pages 140–142.

It is known that the ability to withstand partial corona discharges and surge voltages is improved by filling the gaps and voids in the winding of the feedthrough insulator body with an insulating medium, such as sulfur hexafluoride ($SF_6$). The strength of an electric field required to produce partial discharge in $SF_6$ is more than double the field strength at which partial discharges occur in air. Accordingly, any air which is present in the winding of the insulator body must be removed by pumping, and replaced by $SF_6$. The process of removing air and filling the spaces within the insulator body with the insulating medium $SF_6$ is facilitated by using polypropylene foils which are not smooth, but which are embossed so as to be dimpled. A dimpled surface pattern for the polypropylene foils will allow many of the gaps and voids which are present in the insulator body to be connected with one another, thereby facilitating their evacuation of air and filling with the insulating medium.

It is a problem with such insulators which are wound of dimpled insulating foils that when the insulator body is subjected to elevated temperatures, illustratively above 80° C., the winding becomes loose and loses mechanical strength. This loss of mechanical rigidity results from shrinkage of the foil material which causes shrinkage of the dimples. Moreover, the diameter of the insulator body winding is reduced by the shrinkage, thereby producing kinks in the potential control inserts therein, resulting in an increase in the electric field strength at the edges of the insulator body, for a given conductor voltage. This causes a disadvantageous reduction in the ability of the insulator to withstand surge voltages, and increases the possibility of corona discharges.

It is a further disadvantage with the known insulator windings that insulating foils which have been embossed to produce the desired dimples are obtainable only in relatively small widths, illustratively one meter. Accordingly, a plurality of webs of insulator foils must be wound in a staggered arrangement to produce insulator bushings which are longer than this width. Insulator bushings which are used in 420 kilovolt systems are usually about 3 meters in length. The complex winding technique which is required to produce such a long insulator bushing is costly.

It is, therefore, an object of this invention to provide an improved wound insulator body for use in high voltage systems which has sufficient mechanical strength at elevated operating temperatures, illustratively, a generally occurring operating temperature of approximately 120° C.

It is a further object of this invention to provide a high voltage insulator bushing, the foil windings of which will not loosen or shift axially when the bushing is arranged vertically.

SUMMARY OF THE INVENTION

The foregoing and other objects are achieved by this invention which provides a high voltage insulator bushing which is constructed using embossed insulating foils which have been subjected to a thermal shrinkage treatment prior to the winding operation.

The embossed insulating foils experience a measure of shrinkage during the thermal shrinking treatment prior to winding the foils into an insulator body. Such preshrunk foils will further shrink only a small amount for temperatures up to the particular temperature chosen for the thermal pretreatment. Thus, when wound into an insulator body, the pretreated foils will not shrink significantly when subjected to normal operating temperatures, thereby producing a mechanically rigid insulator body. Since much of the original embossing of the insulating foil is preserved, and not completely eliminated by the thermal shrinking treatment, sufficient continuity exists between the gaps and voids in the insulator body to permit relatively easy evacuation of air and permeation by an insulating medium such as $SF_6$.

In a further embodiment of the invention, at least one layer of smooth insulating foil is wound between the layers of embossed insulating foils. Such smooth foils, which are manufactured in substantially greater widths than the embossed foils, permit an increase in the mechanical strength of the winding along the longitudinal direction. Moreover, if, for example, only every second layer of insulating foil is of the embossed type, the percentage of shrinkage of the volume of the insulator body is less than if exclusively embossed foils are used, as in known high voltage insulator bushings.

It is a feature of this invention that the permeability of the subject insulator bushing having smooth and embossed foil windings is sufficient to readily permit evacuation of air and saturation by an insulating medium.

BRIEF DESCRIPTION OF THE DRAWINGS

Comprehension of the invention is facilitated by reading the following detailed description in conjunction with the annexed drawings, in which:

FIG. 1 is a schematic representation of a high voltage insulator bushing constructed in accordance with the principles of the invention; and FIG. 2 is a magnified view of a portion of the bushing of FIG. 1, showing greater detail.

DETAILED DESCRIPTION

FIG. 1 shows a longitudinal cross-sectional view of a high voltage insulator bushing which may be used, for example, as part of a termination of a high voltage cable (see: Report No. 32.09, supra). The insulator bushing is provided with a central conductor 2 which may be a copper tube bearing a high voltage, illustratively 200 kilovolts at 50 hertz. An insulator body 3 is concentrically arranged around the conductor, and has two conically-tapered surface portions 4 and 5 on respective sides of a cylindrical surface 6. The insulator body is wound from an insulating foil which may be a special paper or a plastic foil. A plurality of capacitor inserts 7, 8, 9, and 10 are represented in the figure by lines which are shown parallel to the central longitudinal axis (not specifically shown) of the conductor. The inserts are arranged with respect to one another so as to achieve a linear potential gradient along tapered surfaces 4 and 5 in a direction which extends outwardly from the central longitudinal axis of the conductor. Substantially linear potential distribution may be achieved along the surfaces 4 and 5 by the advantageous selection of the radial distances between the individual capacitor inserts with respect to the central longitudinal axis of the conductor (see, for example: U.S. Pat. No. 3,462,545). In such an arrangement, capacitor inserts 8 and 9, which are closest to conductor 2, are at high voltage potential, while the outermost capacitor insert 10, which is near cylindrical surface 6, is provided with a terminal 11 for permitting an electrical connection to ground.

In some embodiments of the invention, the dielectric strength of insulator body 3 may be increased by optional impregnation with an insulating medium. Such a medium may be an oil, or a gas, such as sulfur hexafluoride ($SF_6$) or nitrogen ($N_2$). It will be assumed that the specific illustrative embodiment of insulator body 3 under discussion is impregnated with $SF_6$ (see: SIGRE 1972, Paper No. 15-02).

High voltage bushing embodiments which are intended for use at low temperatures, such as terminations of super conducting cables, may be saturated with a cryogenic medium such as helium, (see: German Patent DE-OS No. 2,327,629).

FIG. 2 is a magnified view of cross-sectional area 12 of insulator body 3 in FIG. 1. Elements of structure in FIG. 2 which are also shown in FIG. 1 are identified with the same reference symbols.

In accordance with the invention, FIG. 2 shows that the insulator body is at least partially wound of embossed plastic foils 15, which may be formed of polypropylene or polyethylene foil material. The high voltage bushing also contains several layers of smooth insulating foils 14, which can be produced in widths which correspond to the length of the bushing insulator. Accordingly, layers 14 of smooth foil may be wound of only a single sheet of foil, thereby avoiding joints and overlaps within a layer.

The figure shows embossed insulating foils 15 interposed between layers of smooth insulating foils 14. The embossed foils are provided with dimples so as to produce voids 16 at the interfaces between the smooth and embossed foil layers. In some embodiments, it is desirable that embossed foils 15 contain between 300 and 700 dimples per square centimeter, and preferably approximately 500 dimples per square centimeter. Embossed foils 15 consist of a plastic material, such as polypropylene, which exhibits dimensional shrinkage above a predetermined threshold temperature. This predetermined threshold temperature is generally exceeded during operation of the insulator body. The embossed foils may be produced by embossing a polypropylene foil of approximately 40 micrometers thick in a calender at temperatures between 120° and 150° C. The resulting embossed foil has an overall thickness of between 60 and 80 micrometers.

As previously indicated, polypropylene foils and their embossed dimples have been observed to shrink at temperatures above 80° C. This shrinkage, however, is anticipated in accordance with the invention by thermally pretreating the embossed foils, prior to winding the insulator body, at temperatures between 80° C. and 125° C., and preferably between 100° C. and 120° C. In the specific illustrative embodiment, the pretreatment temperature is chosen so as to be near the maximum temperature of winding 3 during high voltage operation of the insulator bushing. In practice, the shrinkage of the dimples achieved by such pretreatment should not exceed one-half of the thickness differential between the overall thickness of the embossed, thermally untreated foils, and the thickness of a corresponding smooth foil. It has been observed that the shrinkage of foils in the insulator body winding during operation does not significantly exceed the amount of preshrinkage achieved during thermal pretreatment. Thus, adequate mechanical strength of the insulator body is achieved. Moreover, since the overall thickness of a thermally pretreated embossed foil is at least twenty percent larger than the thickness of a smooth foil, an adequate amount of permeability between the foil layers in winding 3 exists to permit penetration by the insulating medium, such as $SF_6$ gas, into voids 16 which are produced between adjacent foil layers by the dimples of the embossed foils.

As previously indicated, embossed foils 15 are available in sheets having only relatively small widths of approximately one meter. Accordingly, insulator bodies which are longer than one meter are wound with several webs which are staggered with respect to each other. The embossed foils of a layer can be advantageously wound with butt joints. FIG. 2 shows butt joints 17 in embossed foil layers 15 which have been wound, in this embodiment, without technical difficulty.

FIG. 2 further shows a capacitor control insert 10 which may be, for example, a thin foil of metal such as aluminum. Alternatively, the capacitor inserts may be formed of double layer foils containing an electrically conductive layer of metal and an insulating layer of a plastic, such as polyvinylchloride, polyethylene, polypropylene, or polycarbonate.

Although the inventive concept disclosed herein has been described in terms of a specific embodiment and application, other applications and embodiments will be obvious to persons skilled in the pertinent art without departing from the scope of the invention. Thus, for example, although the specific illustrative embodiment has been disclosed as a high voltage insulator bushing arranged around an electric conductor at high voltage with respect to ground, the invention is equally well suited for use in arrangements wherein high voltage potential is applied to the outside of the bushing, and ground potential is applied to the central conductor. The drawings and descriptions of the specific illustrative embodiment of the invention in this disclosure are illustrative of applications of the invention and should not be construed to limit the scope thereof.

What is claimed is:

1. A high voltage insulator bushing of the type having at least one conductor part at a high voltage with respect to at least a second conductor part at a reference potential, the insulator bushing further having an insulator body disposed between said first and second conductor parts which is formed of at least one wound, smooth insulating foil with electrically conductive potential control inserts disposed within preselected windings of the insulating foil in the insulator body, the insulator body being impregnated with a liquid insulating medium, the insulator bushing further comprising as at least one layer of the insulator body, an embossed insulating foil formed of a polypropylene material which is embossed with between 300 and 700 dimples per square centimeter, said polypropylene material being of the type which shrinks above a predetermined temperature, said embossed insulating foil having a predetermined smooth thickness in an unstretched state prior to embossing, and a predetermined overall embossed thickness after embossing, said embossed foil having been entirely subjected to a thermal shrinking treatment after embossing and prior to being wound into said insulator body so as to have an overall thickness after said thermal shrinking treatment which is at least 20 percent larger than said predetermined smooth thickness.

2. The high voltage insulator bushing of claim 1 wherein said thermal shrinking treatment shrinks said embossed foil in overall thickness to achieve a maximum reduction in overall thickness of one-half of the thickness differential between said predetermined overall embossed thickness of said embossed insulating foil prior to said thermal shrinking treatment, and said predetermined smooth thickness of said embossed insulating foil prior to embossing.

3. The high voltage insulator bushing of claim 1 wherein said thermal shrinking treatment is performed at a temperature which corresponds at least approximately to a predetermined maximum temperature occurring within an insulator body during high voltage operation.

4. The high voltage insulator bushing of claim 3 wherein said thermal shrinking treatment is performed at a temperature above 80° C.

5. The high voltage insulator bushing of claim 3 wherein said thermal shrinking treatment is performed at a temperature below 125° C.

* * * * *